United States Patent
Chase et al.

(10) Patent No.: US 9,931,777 B2
(45) Date of Patent: Apr. 3, 2018

(54) SIMPLE DEVICE FOR ECONOMICALLY PRODUCING ELECTROSPUN FIBERS AT MODERATE RATES

(71) Applicants: George G. Chase, Wadsworth, OH (US); Kitchaporn Nartetamrongsutt, Bangkok (TH); Hyeon Ung Shin, Seoul (KR)

(72) Inventors: George G. Chase, Wadsworth, OH (US); Kitchaporn Nartetamrongsutt, Bangkok (TH); Hyeon Ung Shin, Seoul (KR)

(73) Assignee: The University of Akron, Akron (*) Notice: Subject to any disclaimer, the term of this patent is extended or adjusted under 35 U.S.C. 154(b) by 778 days.

(21) Appl. No.: 14/565,657

(22) Filed: Dec. 10, 2014

(65) Prior Publication Data

US 2015/0158230 A1    Jun. 11, 2015

Related U.S. Application Data

(60) Provisional application No. 61/914,115, filed on Dec. 10, 2013.

(51) Int. Cl.
| | |
|---|---|
| *B29C 47/00* | (2006.01) |
| *B29D 99/00* | (2010.01) |
| *D01D 5/00* | (2006.01) |
| *B29K 101/00* | (2006.01) |

(52) U.S. Cl.
CPC ...... *B29C 47/0014* (2013.01); *B29D 99/0078* (2013.01); *D01D 5/0007* (2013.01); *D01D 5/0069* (2013.01); *B29K 2101/00* (2013.01)

(58) Field of Classification Search
CPC . B29C 47/0011; B29C 47/0014; B29C 47/30; B29C 47/0028; B29C 47/0066; B29C 47/92; B29D 99/0078; B29K 2101/00; D01D 4/06; D01D 5/0007; D01D 5/003
USPC .................. 425/174.8 E, 72.2, 131.5, 192 S, 425/378.2–382.4, 464
See application file for complete search history.

(56) References Cited

U.S. PATENT DOCUMENTS

| | | | |
|---|---|---|---|
| 4,143,196 A | 3/1979 | Simm et al. | |
| 7,351,052 B2 * | 4/2008 | Chun | D01D 5/0069 425/174.8 E |
| 2002/0122840 A1 * | 9/2002 | Lee | D01D 5/0061 425/174.6 |

FOREIGN PATENT DOCUMENTS

| | | |
|---|---|---|
| EP | 1673493 B1 | 8/2009 |
| EP | 2059630 B1 | 9/2010 |

OTHER PUBLICATIONS

Darrell H. Reneker, et al., Electrospinning jets and polymer nanofibers, Science Direct, Feb. 7, 2008, pp. 2387-2425, Elsevier Ltd.

(Continued)

*Primary Examiner* — Joseph S Del Sole
*Assistant Examiner* — Thu Khanh T. Nguyen
(74) *Attorney, Agent, or Firm* — Renner Kenner Greive Bobak Taylor & Weber

(57) ABSTRACT

An apparatus for the production of electrospun fibers using an electrospinning solution comprising: at least one threaded rod having an exterior surface and having a longitudinal axis oriented vertically, a grounded collector, an electrospinning solution dispenser feeding electrospinning solution to the exterior surface of the threaded rod, and a high voltage power supply.

17 Claims, 9 Drawing Sheets

(56) References Cited

OTHER PUBLICATIONS

Thandavamoorthy Subbiah, et al., Electrospinning of Nanofibers, Journal of Applied Polymer Science, 2005, pp. 557-569, vol. 96, Wiley Periodicals, Inc.

Shagufta U. Patel, et al., The effect of surface energy of woven drainage channels in coalescing filters, Separation and Purification Technology, 2012, pp. 54-61, Issue 87, Elsevier.

Laila Shahreen, et al., NO decomposition by CO over Pd catalyst supported on TiO2 nanofibers, Chemical Engineering Journal, 2013, pp. 340-349, Issue 225, Elsevier.

Sarfaraz U. Patel, et al., Separation of water droplets from water-in-diesel dispersion using superhydrophobic polypropylene fibrous membrans, Separation and Purification Technology, 2014, pp. 62-68, Issue 126, Elsevier.

Goutham Viswanadam, et al., Water-diesel secondary dispersion separation using superhydrophobic tubes of nanofibers, Separation and Purification Technology, 2013, pp. 81-88, Issue 104, Elsevier.

Dan Li, et al. Electrospinning of Nanofibers: Reinventing the Wheel?, Advanced Materials, Jul. 19, 2004, pp. 1151-1170, vol. 16, Issue No. 14.

A.L. Yarin, et al., Upward needleless electrospinning of multiple nanofibers, Science Direct, Feb. 27, 2004, pp. 2977-2980, Elsevier Ltd.

O O Dosunmu, et al., Electrospinning of polymer nanofibres from multiple jets on a porous tubular surface, Nanotechnology, Feb. 2, 2006, pp. 1123-1127, Issue 17.

J.S. Varabhas, et al., Electrospun nanofibers from a porous hollow tube, Science Direct, Jul. 31, 2008, pp. 4226-4229, Elsevier Ltd.

Stanislav Petrik, et al. Production Nozzle-Less Electrospinning Nanofiber Technology, MRS Proceedings, 2009, pp. 1240-WW03-07, vol. 1240, Cambridge University Press.

Lisa S. Carnell, et al., Aligned Mats from Electrospun Single Fibers, Macromolecules, 2008, pp. 5345-5349, vol. 41, Issue No. 14.

Huan Pan, et al., Continuous aligned polymer fibers produced by a modified electrospinning method, Science Direct, May 26, 2006, pp. 4901-4904, Elsevier Ltd.

Goutham Viswanadam, et al., Modified electric fields to control the direction of electrospinning jets, Science Direct, Jan. 16, 2013, pp. 1397-1404, Elsevier Ltd.

Darrell H. Reneker, et al., Bending instability of electrically charged liquid jets of polymer solutions in electrospinning, Journal of Applied Physics, May 1, 2000, pp. 4531-4547, vol. 89, No. 9, AIP Publishing.

George G. Chase, et al., New Methods to Electrospin Nanofibers, Journal of Engineered Fibers and Fabrics, 2011, pp. 33-38, vol. 6, Issue 3.

\* cited by examiner

… … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … …

SIMPLE DEVICE FOR ECONOMICALLY PRODUCING ELECTROSPUN FIBERS AT MODERATE RATES

CROSS-REFERENCE TO RELATED APPLICATIONS

This application claims the benefit of and priority to U.S. Provisional Application No. 61/914,115, filed Dec. 10, 2013, and is entitled to that filing date for priority. The specification, figures and complete disclosure of U.S. Provisional Application No. 61/914,115 are incorporated herein by specific reference for all purposes.

FIELD OF THE INVENTION

The present invention generally relates to an electrospinning electrode and method of producing electrospun fibers. More particularly, the present invention relates to an electrospinning electrode that is cheaper to build than a normal single syringe electrospinning setup and which has a production rate significantly higher than a conventional single syringe electrospinning setup.

BACKGROUND OF THE INVENTION

The electrospinning process is one of the most favorable techniques for fabricating submicron fibers from polymeric melts or solutions. The standard laboratory setup for electrospinning consists of a spinneret (typically a hypodermic syringe needle) connected to a high-voltage (5 to 50 kV) direct current power supply, a syringe pump, and a grounded collector. A liquid, such as a polymer solution, sol-gel, particulate suspension or melt is then loaded into the syringe and the liquid is extruded from the needle tip at a constant rate by a syringe pump. The high-voltage direct current power supply is then applied to the liquid droplet, the body of the liquid becomes charged and electrostatic repulsion counteracts the surface tension, and the droplet is stretched. At a critical point a stream of liquid erupts from the surface and is collected by the grounded collector.

The electrospinning process has many advantages such as being feasible, versatile and effective; which makes it a great method to employ when a polymeric solution needs to be altered to the desirable properties. However, there are some disadvantages to the typical electrospinning process. The main disadvantage which makes the standard electrospinning process undesirable is the low production rate, typically around 0.17 grams an hour. The production rate is limited by the rate at which solution is carried by a single jet. One way of increasing the production rate has been to use multiple jets, but the generation of multiple jets by replicating nozzles significantly increases the capital costs of the equipment. Furthermore, most standard electrospinning setups have a difficult design, are difficult to operate, and are quite expensive to set up and run and when you add in multiple jets, the setup becomes even more expensive and the design becomes even more difficult to design and operate.

Therefore, there is a need in the art for an improved electrospinning setup and electrospinning method which offers an increased production rate over typical syringe electrospinning setup and which is both inexpensive and simple to setup and run when compared to a typical syringe electrospinning setup.

SUMMARY OF THE INVENTION

In a first embodiment, the present invention provides an apparatus for the production of electrospun fibers using an electrospinning solution comprising: at least one threaded rod having an exterior surface and having a longitudinal axis oriented vertically, a grounded collector, an electrospinning solution dispenser feeding electrospinning solution to the exterior surface of the threaded rod, and a high voltage power supply.

In a second embodiment, the present invention provides an apparatus for the production of electrospun fibers as in the first embodiment, wherein the at least one threaded rod is a long-threaded threaded rod.

In a third embodiment, the present invention provides an apparatus for the production of electrospun fibers as in either the first or second embodiment, wherein the high voltage power supply is connected to the at least one threaded rod by a copper wire and supplies a voltage of between about 30 kV and about 60 kV.

In a fourth embodiment, the present invention provides an apparatus for the production of electrospun fibers as in any of the first through third embodiments, wherein the electrospinning solution dispenser is selected from the group consisting of a cup, a cap, or a horizontal pipe.

In a fifth embodiment, the present invention provides an apparatus for the production of electrospun fibers as in any of the first through fourth embodiments, wherein the electrospinning dispensing apparatus can be made out of any suitable elastomeric material such as Polyvinyl chloride (PVC), polyethylene, polypropylene, or materials such as Plexiglass, acrylics, or polycarbonates.

In a sixth embodiment, the present invention provides an apparatus for the production of electrospun fibers as in any of the first through fifth embodiments, wherein the electrospinning solution dispenser is a horizontal pipe and wherein the at least one threaded rod is threaded through at least one aperture in the horizontal pipe.

In a seventh embodiment, the present invention provides an apparatus for the production of electrospun fibers as in any of the first through sixth embodiments, further comprising a pressurized reservoir which loads electrospinning solution into the horizontal pipe and allows for the electrospinning solution to flow down the at least one threaded rod.

In an eighth embodiment, the present invention provides an apparatus for the production of electrospun fibers as in any of the first through seventh embodiments, wherein the at least one threaded rod contains multiple grooves on its surface, said grooves allowing for the electrospinning solution to flow into the grooves and down along the surface of the at least one threaded rod.

In a ninth embodiment, the present invention provides an apparatus for the production of electrospun fibers as in any of the first through eighth embodiments, further comprising a collection device comprising of a collector located at the end of the threaded rod opposite the electrospinning solution dispenser and a pump, wherein the collector collects any excess electrospinning solution and the pump pumps said excess electrospinning solution back to the pressurized reservoir.

In a tenth embodiment, the present invention provides an apparatus for the production of electrospun fibers as in any of the first through ninth embodiments, wherein there is one threaded rod and wherein the grounded collector is a cylindrical grounded collector which is positioned coaxially to the threaded rod.

In an eleventh embodiment, the present invention provides an apparatus for the production of electrospun fibers as in any of the first through tenth embodiments, further comprising at least one secondary electrode positioned around the at least one threaded rod.

In a twelfth embodiment, the present invention provides an apparatus for the production of electrospun fibers as in any of the first through eleventh embodiments, wherein there are three secondary electrodes positioned along three sides of the at least one threaded rod and wherein the grounded collector is positioned along the fourth side of the at least one threaded rod.

In a thirteenth embodiment, the present invention provides an apparatus for the production of electrospun fibers as in any of the first through twelfth embodiments, wherein the three secondary electrodes are charged by a secondary power supply, which supplies a voltage less than the voltage supplied by the high voltage power supply.

In a fourteenth embodiment, the present invention provides an apparatus for the production of electrospun fibers as in any of the first through thirteenth embodiments, wherein the electrospinning solution comprises a polymer and a solvent.

In a fifteenth embodiment, the present invention provides an apparatus for the production of electrospun fibers as in any of the first through fourteenth embodiments, wherein the polymer is selected from the group consisting of polyvinyl pyrrolidone (PVP), polyethylene oxide (PEO), nylon 6, polyurethanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), polymethacrylate (PMMA)/tetrahydroperfluorooctylacrylate (TAN), collagen-PEO, polyaniline (PANI)/PEO blend, PANI/polystyrene (PS), polyvinylcarbazole, polyethylene terephthalate (PET), polyacrylic acid-polypyrene methanol (PAA-PM), polystyrene (PS), polymethacrylate (PMMA), polyamide (PA), polyvinylchloride (PVC), cellulose acetate (CA), PVA/silica, polyacrylamide (PAAm), poly(lactic-co-glycolic acid) (PLGA), collagen, polycaprolactone (PCL), poly(2-hydroxyethyl methacrylate) (HEMA), poly(vinylidene fluoride) (PVDF), polyether imide (PEI), polyethylene gricol (PEG), poly(ferrocenyldimethylsilane) (PFDMS), poly(ethylene-co-vinyl alcohol), or combinations thereof.

In a sixteenth embodiment, the present invention provides an apparatus for the production of electrospun fibers as in any of the first through fifteenth embodiments, wherein the solvent is selected from the group consisting of ethanol, water, dimethylformamide (DMF), formic acid, dimethylaccetamide, dicloromethane, DMF:tetrahydrofuran (1:1), chloroform, tetrahydrofuran, distilled water, methylene chloride, dichlormethane, DMF:toluene (1:9), isopropanol, acetone, isopropyl alcohol, isopropanol, hydrochloric acid, camphorsulfonic acid, trifluoracetic acid, carbon disulfide, methylethylketone, acetic acid, hexafluoro-2-propanol, hexa-fluoro-isopropanol (HFIP), or combination thereof.

In a seventeenth embodiment, the present invention provides an apparatus for the production of electrospun fibers as in any of the first through sixteenth embodiments, wherein the gap distance between the at least one threaded rod and the grounded collector is about 20 cm.

DETAILED DESCRIPTION OF ILLUSTRATIVE EMBODIMENTS

The invention relates to a simple and unique needless electrospinning device and method that employs charged vertically oriented threaded rods for holding multiple drops of a liquid, such as a polymer solution, to launch multiple simultaneous jets from the rod toward one or more collectors. In some embodiments, a single vertically oriented threaded rod is used to launch the jets. In yet other embodiments, multiple vertically oriented threaded rods are arranged in a linear array to launch the jets.

Figure 1:
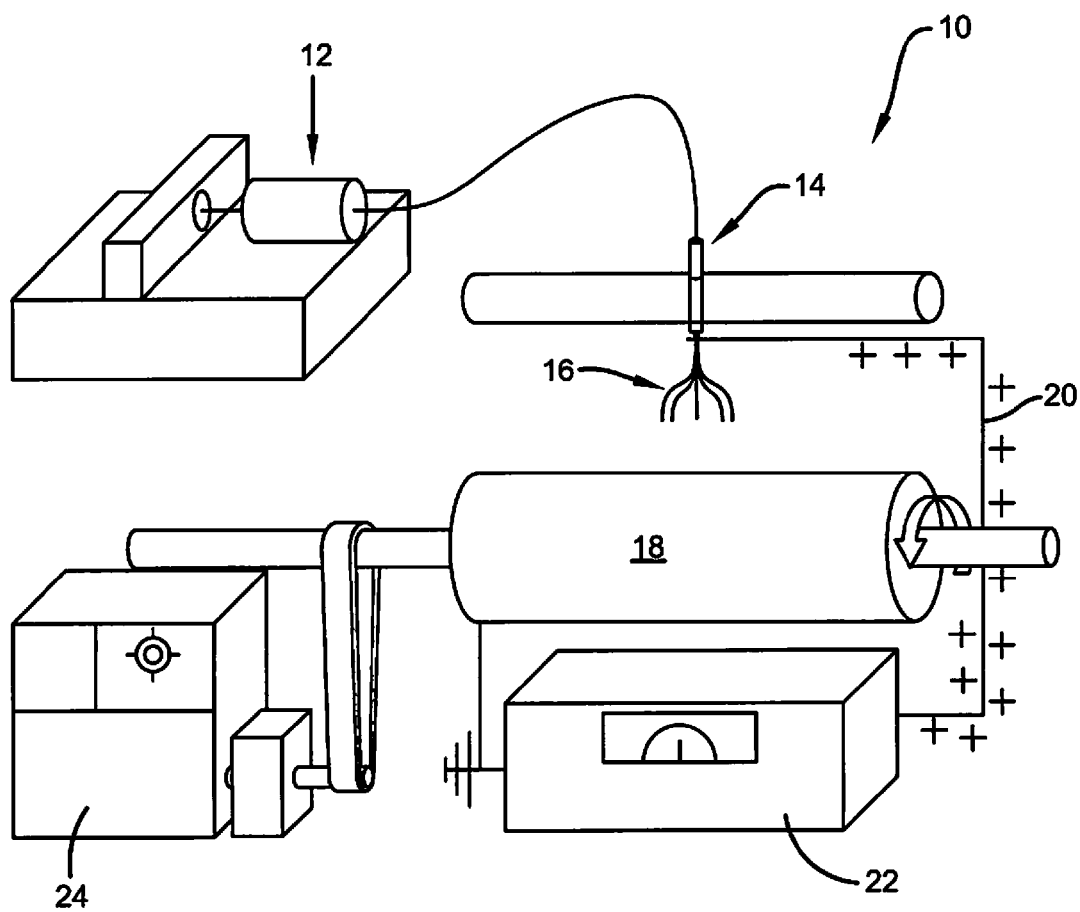
FIG. 1 is a perspective view of a known electrospinning device of the prior art.

The electrospinning performances of the vertically oriented threaded rods are compared to the performance of a prior art single-needle setup, as shown in FIG. 1. The common laboratory electrospinning apparatus 10 contains a syringe 12 that delivers the electrospinning solution as a droplet at the tip of a charged metallic needle 14 (or spinneret) from which jets 16 launch. A grounded rotating collector 18 collects the fibers on its surface, which is typically positioned about 20 cm from the tip of the needle 14. The needle 14 is electrically charged by a copper wire 20 which is connected to a high voltage power supply 22 and the grounded rotating collector 18 is rotated by a motor 24.

Figure 2:
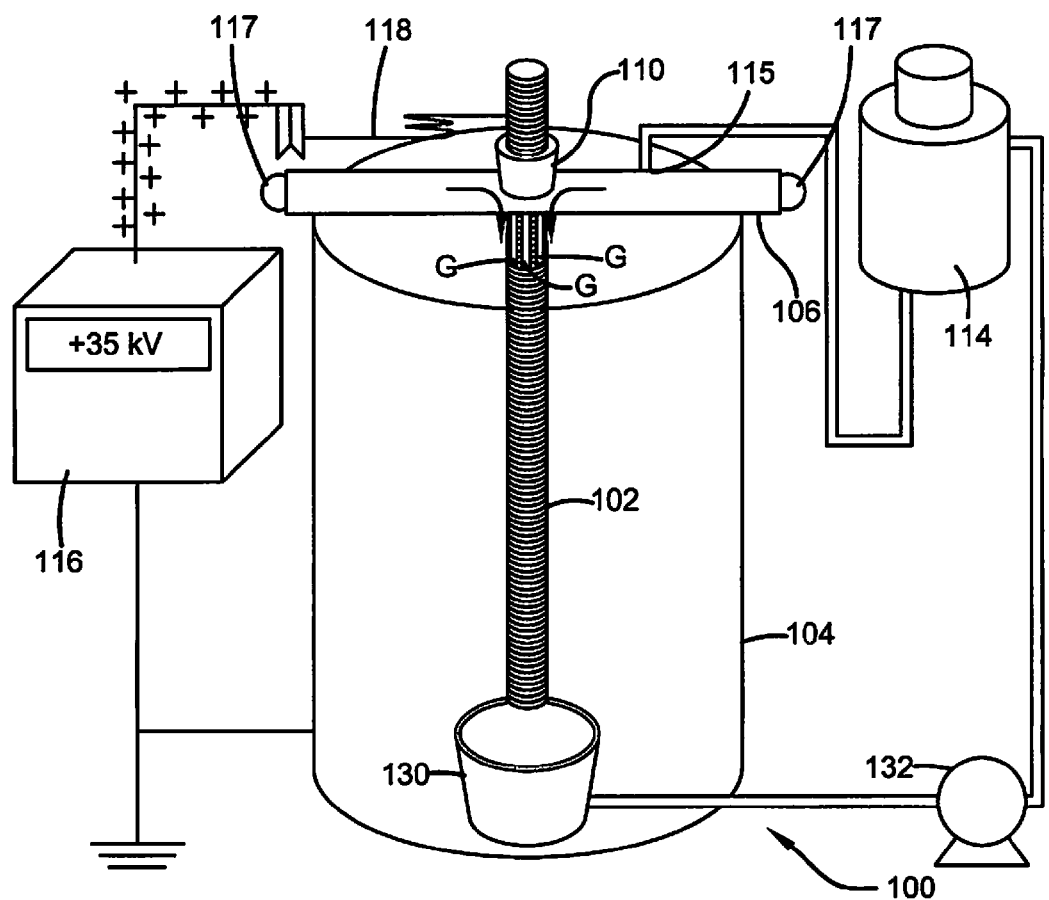
FIG. 2 is a perspective view of one embodiment of the electrospinning device of the present invention.

With reference to FIG. 2, a first embodiment of this invention provides an apparatus 100 for the production of electrospun fibers. The apparatus 100 includes a threaded rod 102, oriented vertically such that electrospinning solution fed to the threaded rod 102 flows downward along the threads by gravity. By "oriented vertically", it is meant broadly that the longitudinal axis of the rod is oriented generally vertically relative to gravity, though it need not be orthogonal to the ground (or parallel to the direction of gravity). Of course, in some embodiments the rod is oriented orthogonal to the ground (i.e., parallel to the direction of gravity) to avoid collecting of electrospinning solution on a downward facing thread portions. As the droplets move down the threads of the threaded rod 102, multiple jets launch from the droplets, creating fibers that are collected on a grounded collector 104 adjacent the threaded rod. In some embodiments, the grounded collector 104 is semi-cylindrical, at least partially surrounding the threaded rod 102. In other embodiments, the grounded collector 104 is cylindrical and fully surrounds the threaded rod 102. In yet other embodiments, the grounded collector 104 is positioned coaxially to the threaded rod 102, as specifically shown in FIG. 2. In such specific embodiments, the grounded collector 104 has the same geometry of the threaded rod 102 and is more appropriate as a collector than a traditional grounded flat collector. However, various shaped collectors can be used, such as a flat collector. The grounded collector 104, however, is optimal because it maximizes the opportunity for jets to launch in any direction transverse (including oblique and perpendicular) to the threaded rod 102.

In some embodiments, the gap distance between the collector 104 and the threaded rod 102 is less than 30 cm. In other embodiments, the gap distance between the collector 104 and the threaded rod 102 is less than 25 cm. In yet other embodiments, the gap distance between the collector 104 and the threaded rod 102 is less than 22 cm. In some embodiments the gap distance between the collector 104 and the threaded rod 102 is greater than 5 cm. In other embodiments, the gap distance between the collector 104 and the threaded rod 102 is greater than 10 cm. In yet other embodiments, the gap distance between the collector 104 and the threaded rod 102 is greater than 18 cm. In some embodiments, the gap distance is from 5 cm or more to 30 cm or less, in other embodiments, from 10 cm or more to 25 cm or less, and in other embodiments, from 18 cm or more to 22 cm or less. In some embodiments the gap is about 20 cm.

An electrospinning solution dispenser 106 advances droplets of the electrospinning solution to the exterior surface of the threaded rod 102. In some embodiments, the electrospinning solution dispenser 106 is selected from a cup, a cap, or a horizontal pipe. In the embodiment shown in the figures, the electrospinning solution dispenser 106 is a horizontal pipe. In some embodiments, the electrospinning solution dispenser can be made out of any suitable elastomeric material such as polyvinyl chloride (PVC), polyethylene, polypropylene, or materials such as poly(methyl methacrylate) (e.g., Plexiglas™), acrylics, or polycarbonates.

The electrospinning solution can be any liquid (whether a true solvent/solute solution or not) capable of being electrospun. In an embodiment of this invention, the electrospinning solution comprises a polymer dissolved in a solvent. The polymer is selected from the group consisting of polyvinyl pyrrolidone (PVP), polyethylene oxide (PEO), nylon 6, polyurethanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), polymethacrylate (PMMA)/tetrahydroperfluorooctylacrylate (TAN), collagen-PEO, polyaniline (PANI)/PEO blend, PANI/polystyrene (PS), polyvinylcarbazole, polyethylene terephthalate (PET), polyacrylic acid-polypyrene methanol (PAA-PM), polystyrene (PS), polymethacrylate (PMMA), polyamide (PA), polyvinylchloride (PVC), cellulose acetate (CA), PVA/silica, polyacrylamide (PAAm), poly(lactic-co-glycolic acid) (PLGA), collagen, polycaprolactone (PCL), poly(2-hydroxyethyl methacrylate) (HEMA), poly(vinylidene fluoride) (PVDF), polyether imide (PEI), polyethylene gricol (PEG), poly(ferrocenyldimethylsilane) (PFDMS), poly(ethylene-co-vinyl alcohol), or combinations thereof.

The solvent is selected from the group consisting of ethanol, water, dimethylformamide (DMF), formic acid, dimethylaccetamide, dicloromethane, DMF:tetrahydrofuran (1:1), chloroform, tetrahydrofuran, distilled water, methylene chloride, dichlormethane, DMF:toluene (1:9), isopropanol, acetone, isopropyl alcohol, isopropanol, hydrochloric acid, camphorsulfonic acid, trifluoracetic acid, carbon disulfide, methylethylketone, acetic acid, hexafluoro-2-propanol, hexa-fluoro-isopropanol (HFIP), or combination thereof.

Figure 3:
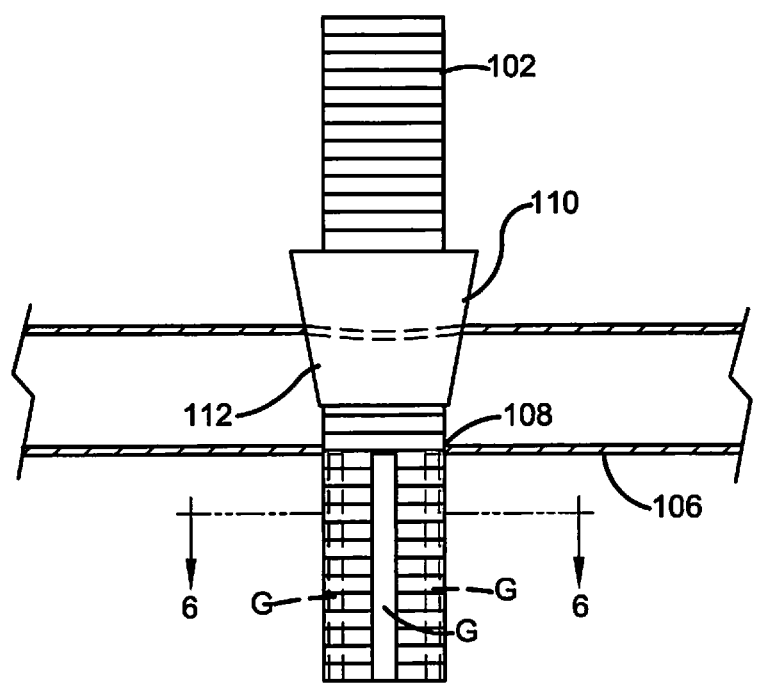
FIG. 3 is a front elevational view of one embodiment of the relationship between a threaded rod and the horizontal pipe of the present invention.

FIG. 3 shows the relationship between the threaded rod 102 and the horizontal pipe. The threaded rod 102 is threaded through aperture 112 on the top side of the horizontal pipe and is then threaded through aperture 108 on the bottom side of the horizontal pipe 106. The use of a threaded rod 102, as opposed to a smooth rod serves to increase the surface area and roughness of the rod surface thus increasing the local electric field at the surface of the rod and providing a high contact area for the electrospinning solution. A rubber stopper 110 is placed at the point of connection at aperture 112 of the horizontal pipe and the threaded rod 102. The rubber stopper 110 is not necessary but helps to hold the top of the threaded rod 102 in place. The electrospinning solution is loaded into the horizontal pipe from a pressurized reservoir 114 at aperture 115 located in the horizontal pipe. Two rubber stoppers 117 help close the open ends of the horizontal pipe so that no electrospinning solution can escape from the sides.

Figure 6:
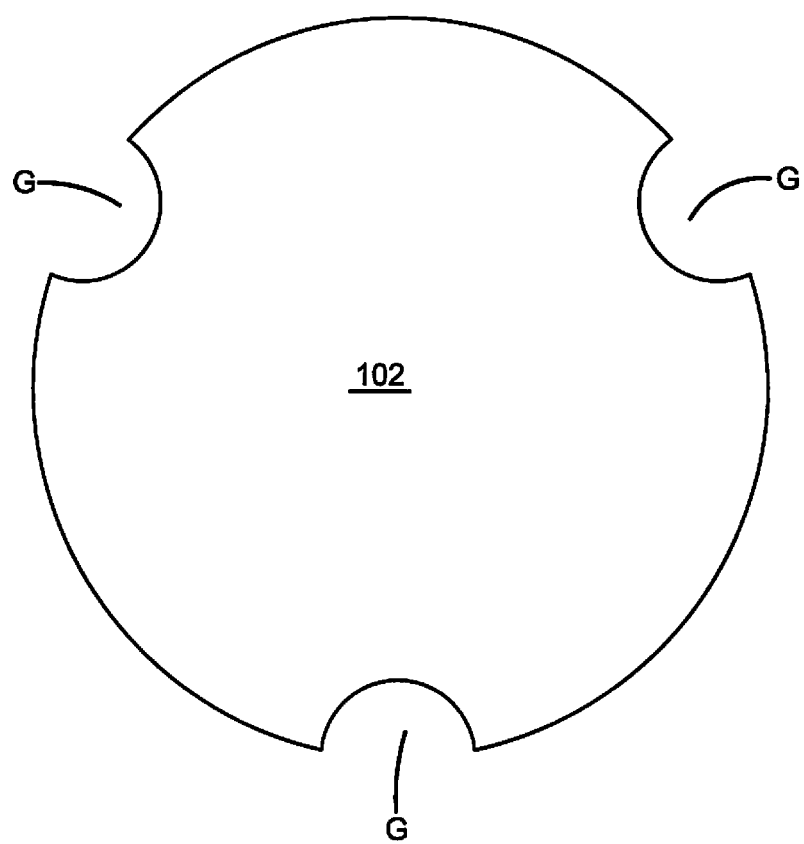
FIG. 6 is a cross-sectional view of the threaded rod, taken along the line 6-6 in FIG. 3.

The electrospinning solution is forced to flow down small grooves G which are machined axially into the surface of the threaded rod 102 where it protrudes through the aperture 108 in the horizontal pipe 106. Grooves G of the threaded rod 102 are shown in FIG. 6. The grooves G allow for the electrospinning solution to flow into the grooves G and down along the threaded surface of the threaded rod 102 by gravitational force. In an alternative embodiment, instead of modifying the threaded rod 102 with grooves G, three small holes are drilled in an electrospinning solution dispenser 106 along the periphery of the aperture 108 to allow for the electrospinning solution to flow through the holes and down along the threaded surface of the threaded rod 102 by gravitational force. Although FIG. 2 and FIG. 3 show three grooves G, those skilled in the art know any number of grooves G could be used. The threaded rod 102 is electrically charged by a wire 118 connected to a high voltage power supply 116.

The onset of electrospinning and the formation of the Taylor cone (cone shaped drop) can occur with voltages as low as about 2000 volts (2 kV). The upper limit of the applied voltage occurs at the ionization voltage or dielectric breakdown of air at voltages at about 100000 volts (100 kV). The actual voltage depends on the distance between the charged and grounded electrodes. Typical electrospinning voltage gradients are about 0.5 to 2 kV per cm. Typical gap distances are about 5 to 30 cm. In some embodiments, the power supply 116 provides a voltage of at least 10 kV. In other embodiments, the power supply 116 provides a voltage of at least 20 kV, in other embodiments, at least 30 kV, and in other embodiments, at least 40 kV. In some embodiments, the power supply 116 provides a voltage of less than 100 kV. In other embodiments, the power supply 116 provides a voltage of less than 70 kV, in other embodiments, less than 60 kV, and in other embodiments, less than 55 kV. In some embodiments, the power supply 116 provides a voltage of from 10 or more to 100 or less kV. In other embodiments, the power supply 116 provides a voltage of from 20 or more to 70 or less kV, in other embodiments, from 30 or more to 60 or less kV, and in other embodiments, from 40 or more to 55 or less kV. In an alternative embodiment, the wire 118 could be dipped directly into the electrospinning solution to charge the solution itself.

Once the threaded rod 102 is electrically charged, or the electrospinning solution is charged, the electrical forces overcome the surface tension forces of the electrospinning solution, and multiple thin liquid fibers are simultaneously launched from multiple points along the axis of the threaded rod 102 toward the collector 104, as generally achieved in standard electrospinning.

To make sure that the apparatus 100 works to its full potential, the electrospinning solution must not dry out before it reaches the bottom of the threaded rod 102. Therefore, in one embodiment of the present invention, the apparatus will utilize a collection device which will pump the electrospinning solution back up to the pressurized reservoir 114. As shown in FIG. 2, the collection device comprises a collector 130 and a pump 132. The electrospinning solution will flow down the threaded rod 102 until it reaches a collector 130. A pump 132 will then be used to pump the electrospinning solution back up to the pressurized reservoir 114. Then, if needed, more solvent will be added to the electrospinning solution, and then the pressurized reservoir 114 will recycle the electrospinning solution and it will be loaded back into the horizontal pipe. The type of solvent chosen to make the electrospinning solution will determine how long the threaded rod 102 should be and will also determine where the collection device should be placed.

Figure 4:
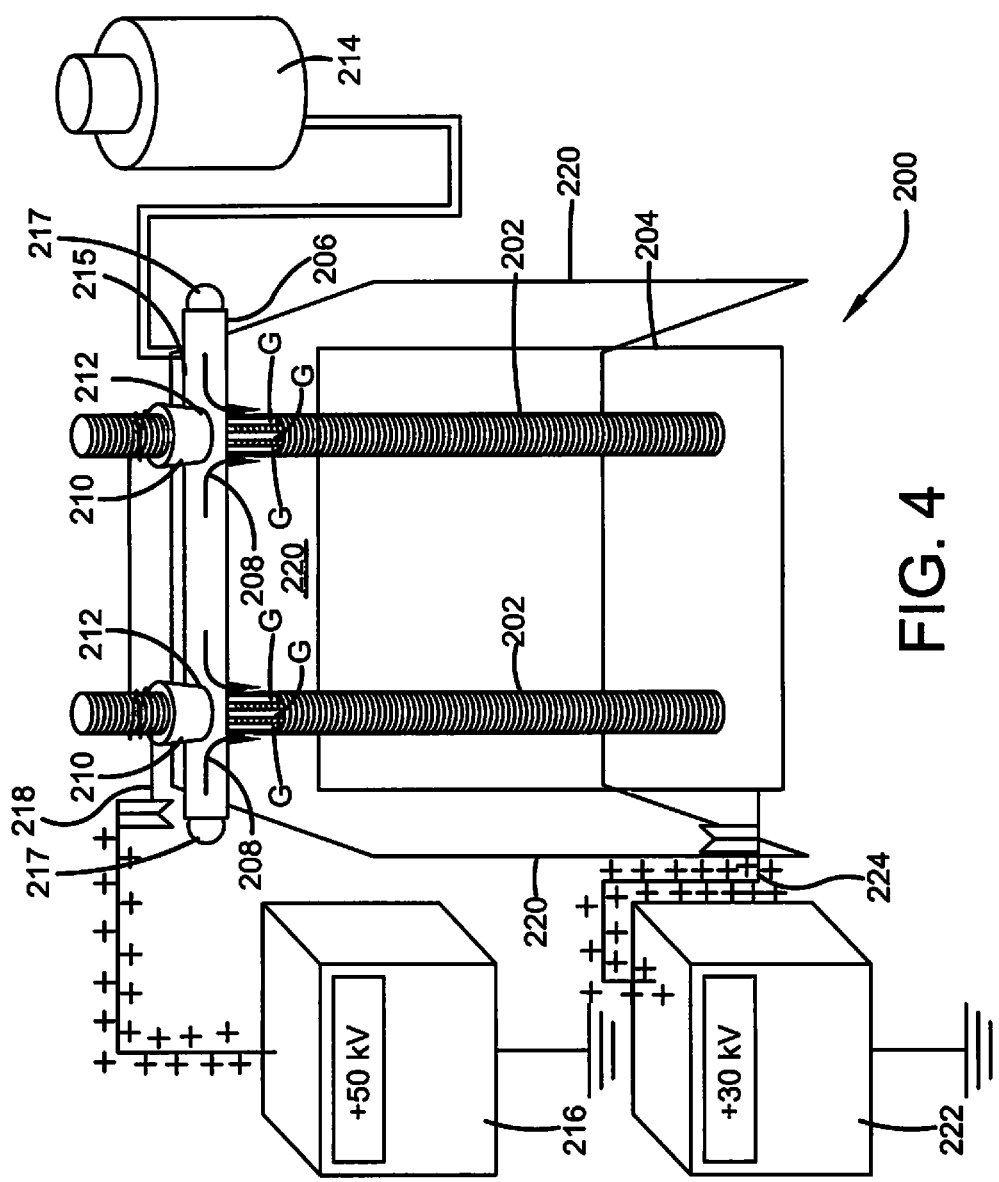
FIG. 4 is a perspective view of another embodiment of the electrospinning device of the present invention.

With reference to FIG. 4, a second embodiment of this invention provides an apparatus 200 for the production of electrospun fibers. The apparatus 200 includes at least one threaded rod 202 in which droplets of the electrospinning solution flow downward along the surface of the rods 202, and secondary electrodes 220 which are positioned around the at least one threaded rod 202. Although FIG. 4 shows the use of two long-threaded rods 202, this invention is not limited to that specific amount of rods 202 and those skilled in the art know any number of rods 202 could be used. As the droplets move down the rods 202, many jets will launch from the droplets and those jets are collected on a grounded collector 204 which is positioned across from only one side of the threaded rod 202. The gap distance between the collector 204 and the at least one threaded rod 202 is about 20 cm in a typical application; to generate a field gradient of about 1 kilovolt per cm. An electrospinning solution dispenser advances droplets of the electrospinning solution to the exterior surface(s) of the at least one threaded rod 202 In some embodiments, the electrospinning solution dispenser 206 is selected from a cup, a cap, or a horizontal pipe. In the embodiment shown in the figures, the electrospinning solution dispenser 206 is a horizontal pipe. In some embodiments, the electrospinning solution dispenser can be made out of any suitable elastomeric material such as polyvinyl chloride (PVC), polyethylene, polypropylene, or materials such as poly(methyl methacrylate) (e.g., Plexiglas™), acrylics, or polycarbonates.

The threaded rods 202 are threaded through apertures 212 on the top side of the horizontal pipe 206 and it then threaded through apertures 208 on the bottom side of the horizontal pipe. Rubber stoppers 210 are placed at the point of connection at apertures 212 of the horizontal rod and the threaded rods 202. The electrospinning solution is loaded into the horizontal pipe from a pressurized reservoir 214 at aperture 215 located in the horizontal pipe. Two rubber stoppers 217 help close the open ends of the horizontal pipe so that no electrospinning solution can escape from the sides. With the two rubber stoppers 217 closing the open ends of the horizontal pipe, the electrospinning solution is forced to flow down small grooves G which are machined axially into the surface of the threaded rods 202 where it protrudes through the aperture 208 in the horizontal pipe. In an alternative embodiment instead of modifying the threaded rods 202 with grooves G, three small holes could be drilled in the electrospinning solution dispenser 206 along the periphery of the aperture 208 to allow for the electrospinning solution to flow through the holes and down along the threaded surface of the rod 202 by gravitational force. Although FIG. 4 show three grooves G, those skilled in the art know any number of grooves G could be used.

Figure 5:
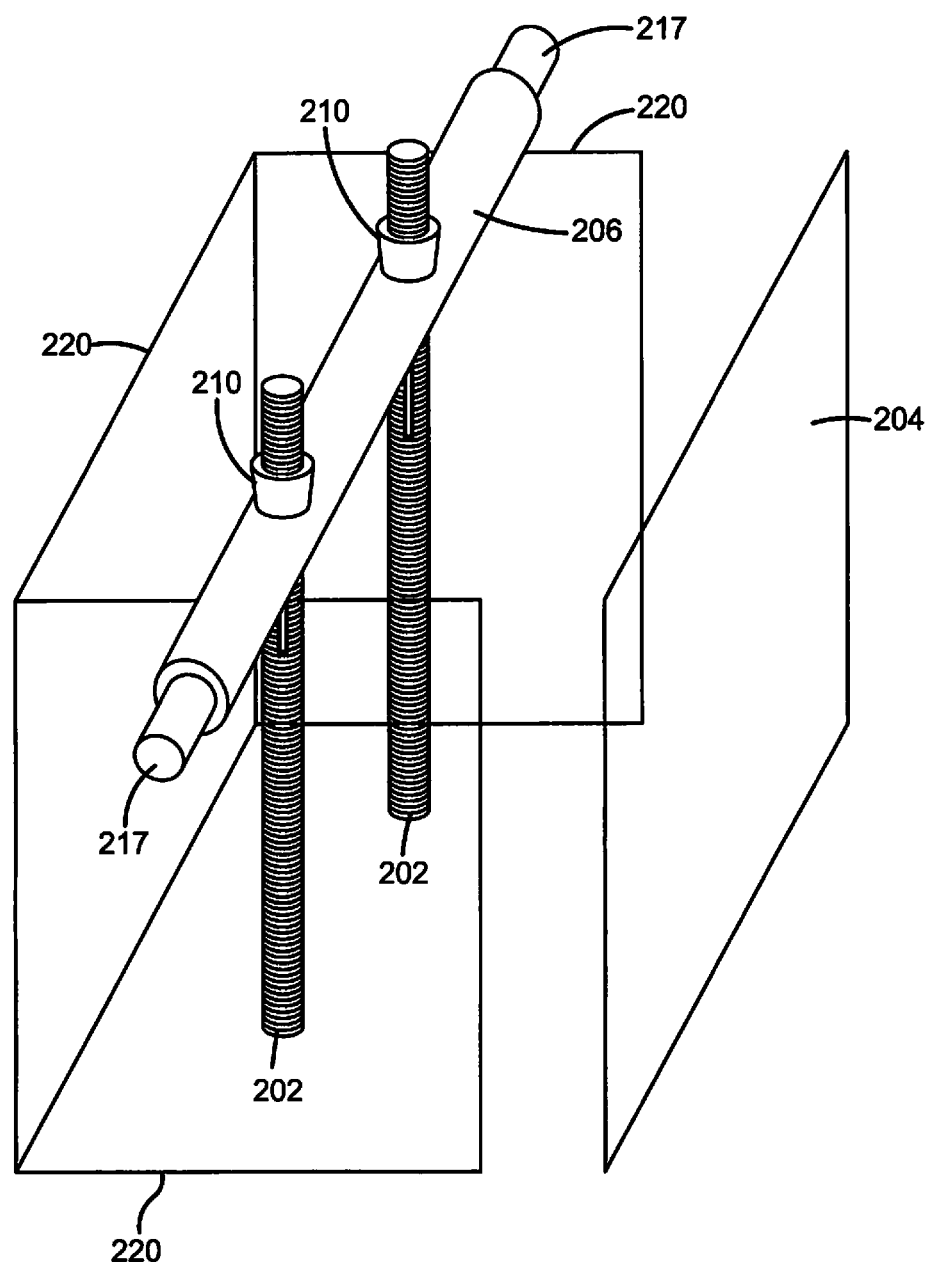
FIG. 5 is a side perspective view of the embodiment of FIG. 5.

The secondary electrodes 220 are positioned around the threaded rods 202. In particular, the secondary electrodes 220 are placed along three sides of the array of threaded rods 202, as shown in FIG. 4 and FIG. 5. In FIG. 4 the secondary electrodes 220 are placed along the two ends of the array and the side opposite the grounded collector 204. FIG. 5 shows a side view of the arrangement of the secondary electrodes 220 as they relate to the rods 202 and the grounded collector 204. The purpose of the secondary electrodes 220 is to direct the jets which launch from the threaded rods 202 in the direction of the grounded collector 204. The threaded rods 202 are electrically charged by a wire 218 which is connected to a high voltage power supply 216. In some embodiments, the power supply 116 provides a voltage of at least 10 kV. In other embodiments, the power supply 116 provides a voltage of at least 20 kV, in other embodiments, at least 30 kV, and in other embodiments, at least 40 kV. In some embodiments, the power supply 116 provides a voltage of less than 100 kV. In other embodiments, the power supply 116 provides a voltage of less than 70 kV, in other embodiments, less than 60 kV, and in other embodiments, less than 55 kV. In some embodiments, the power supply 116 provides a voltage of from 10 or more to 100 or less kV. In other embodiments, the power supply 116 provides a voltage of from 20 or more to 70 or less kV, in other embodiments, from 30 or more to 60 or less kV, and in other embodiments, from 40 or more to 55 or less kV.

The secondary electrodes 220 are electrically charged by a wire 224 which is connected to a secondary power supply 222. The secondary electrodes may have voltages from zero to voltages exceeding the potential of the rods 202. In some embodiments, the secondary electrodes 220 are charged from about 60% or more to about 80% of less of the potential of the threaded rods 202. Once the threaded rods 202 are electrically charged, the electrical forces overcome the surface tension forces of the electrospinning solution, and multiple thin liquid fibers simultaneously are launched from multiple points along the axis of the threaded rods 202 and are directed towards the collector 204 by the secondary electrodes 220.

EXPERIMENTAL

Experimental Description

The production rate of electrospun fibers fabricated from the apparatus 100 of the present invention, apparatuses 200 of the present invention, and from the traditional single syringe electrospinning setup 10 were compared. Four different versions of apparatus 200 were tested, the first version having one threaded rod 202, the second version having two threaded rods 202, the third version having four threaded rods 202, and the fourth version having five threaded rods 202. For all setups, the gap distance between the electrode(s) and the grounded collector were maintained at 20 cm. The flow rate of the syringe pump used with the traditional single syringe electrospinning setup 10 was 15 µl/min. For all setups, the electrospinning solution used was a 6 wt % solution of Polyvinylpyrrolidone (PVP, Aldrich, MW: 1,300,00) which was prepared by dissolving PVP in ethanol (AAPER alcohol, 200 proof). The solution was mixed using a magnetic stirrer for 24 hours at room temperature to completely dissolve the PVP particles.

Results and Discussion

Figure 7:
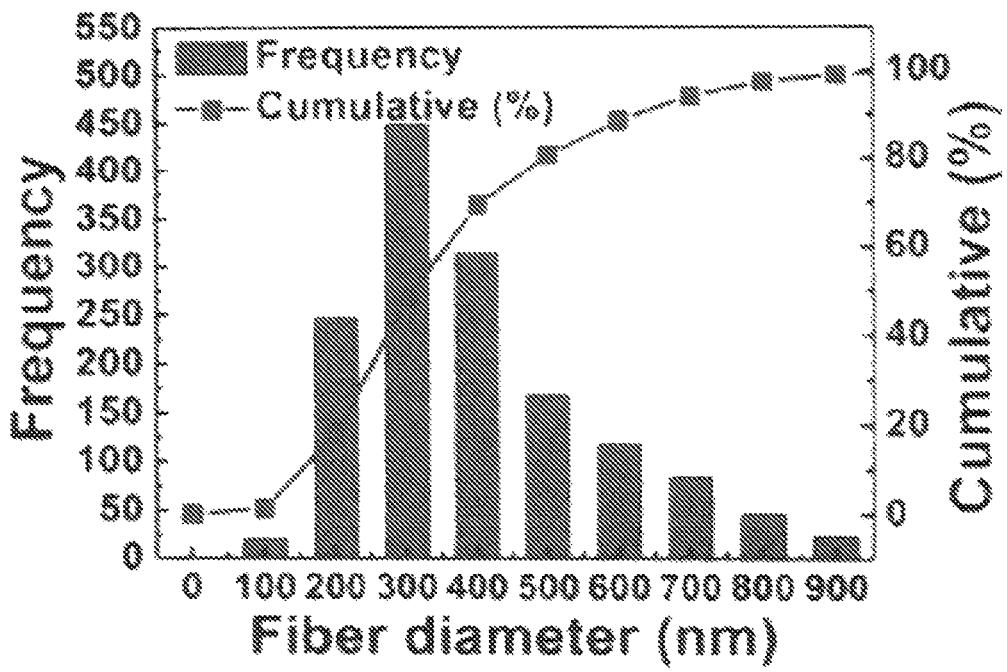
FIG. 7 shows the fiber distribution of the fibers collected from an embodiment of the electrospinning device as shown in FIG. 2.
Figure 8:
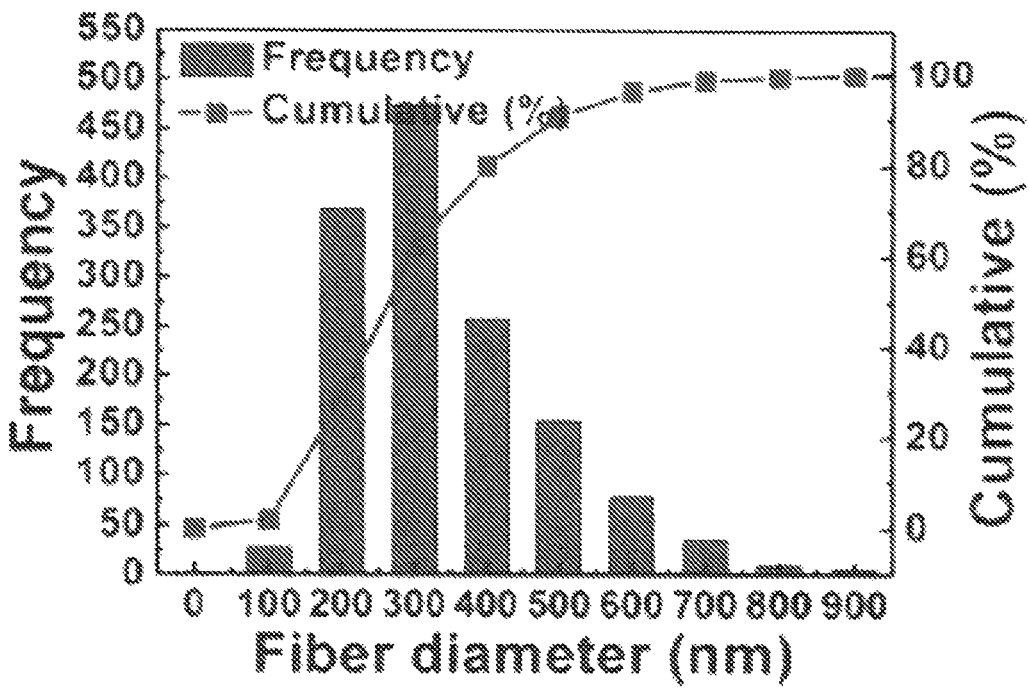
FIG. 8 shows the fiber distribution of the fibers collected from the know electrospinning device of the prior art as shown in FIG. 1.

The fiber morphology, fiber diameter distribution, average fiber diameter, and production rates produced from the apparatus 100 and the traditional single syringe electrospinning setup 10 were compared. The morphologies of the fibers produced by apparatus 100 and the traditional single syringe electrospinning setup 10 were both relatively smooth and without beads. FIG. 7 shows the fiber distribution of the fibers collected from apparatus 100 and FIG. 8 shows the fiber distribution of the fibers collected from the traditional single syringe electrospinning setup 10. As the graphs show, the diameter distributions of the fibers from both the apparatus 100 and the traditional single syringe electrospinning setup 10 were similar.

It was determined that the average fiber diameter of the fibers produced by apparatus 100 was 353±186 nm, which was larger than the average diameter of the fibers produced by the traditional single syringe electrospinning setup 10, which was determined to be 295±144 nm. The production rate of the apparatus 100 was determined to be 4.68±1.75 g/hr, which was about 30 times greater than the 0.17±0.0018 g/hr produced by the traditional single syringe electrospinning setup 10. This results shows that the apparatus 100 of the present invention can significantly increase the rate of producing electrospun fibers.

A plot of the electric filed current density and a contour plot of the dimensionless potential field for a threaded rod 102 surrounded by the cylindrical grounded collector 104 of the apparatus 100 indicated that the vectors symmetrically point from the center of the threaded rod 102 towards the cylindrical grounded collector 104, which is positioned axi-symmetric to the threaded rod 102. The plots indicated the uniformity of the potential field with the coordinate angle and the decrease in the dimensionless potential from 1 to 0 with radial distance between the surface of the threaded rod 102 and the cylindrical grounded collector 104.

The fiber morphology, fiber diameter distribution, average fiber diameter, and production rates produced from the four different versions of apparatus 200 were compared. The morphologies of the fibers produced by the four different configurations of apparatus 200 were relatively smooth and without beads.

Figure 9:
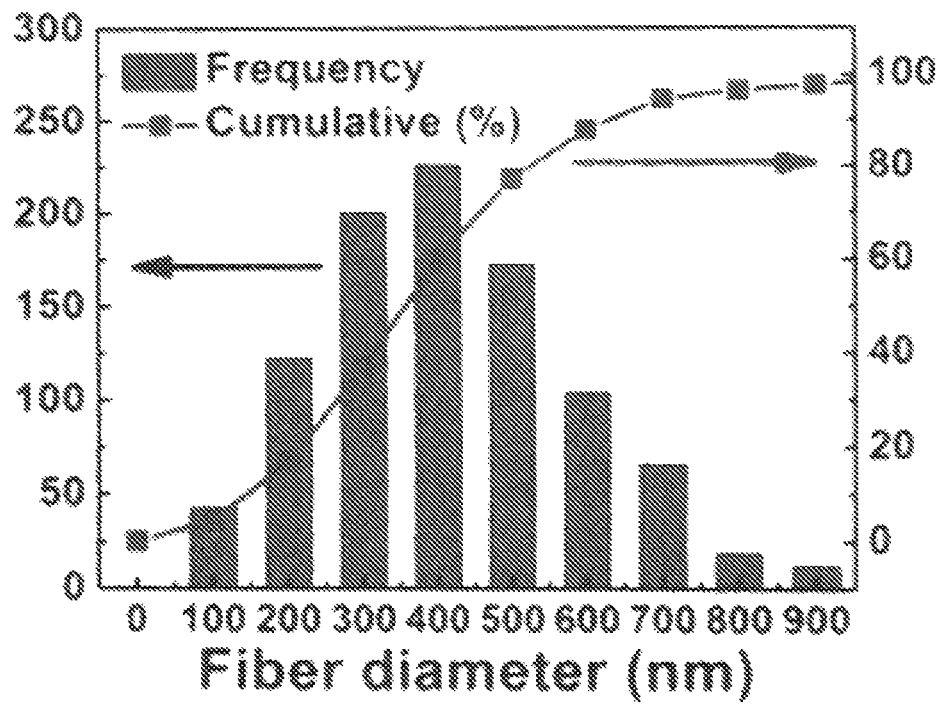
FIG. 9 shows the fiber distribution of the fibers collected from an array of one rod in an embodiment of the electrospinning device as shown in FIG. 4.
Figure 10:
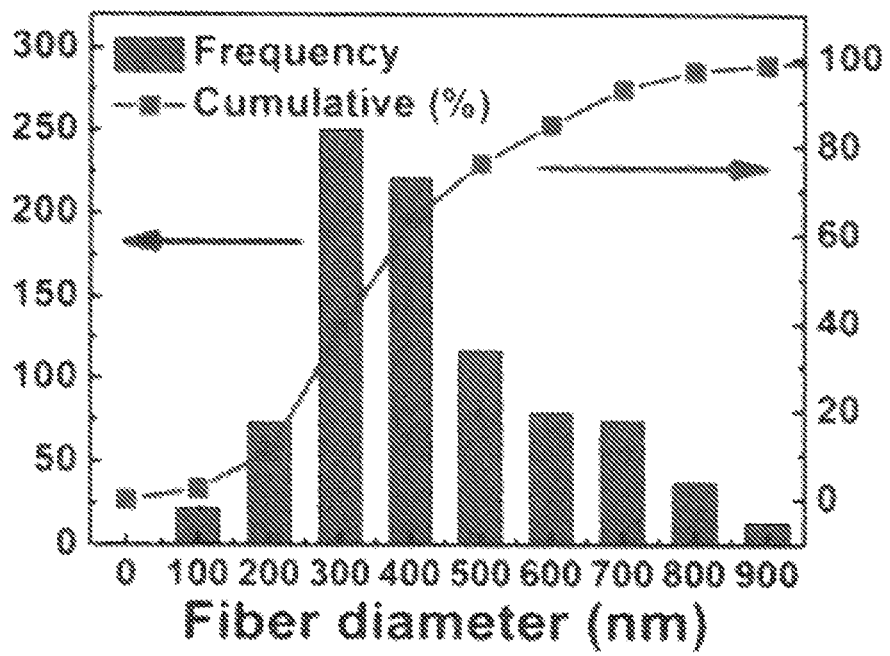
FIG. 10 shows the fiber distribution of the fibers collected from an array of two rods in in an embodiment of the electrospinning device as shown in FIG. 4.
Figure 11:
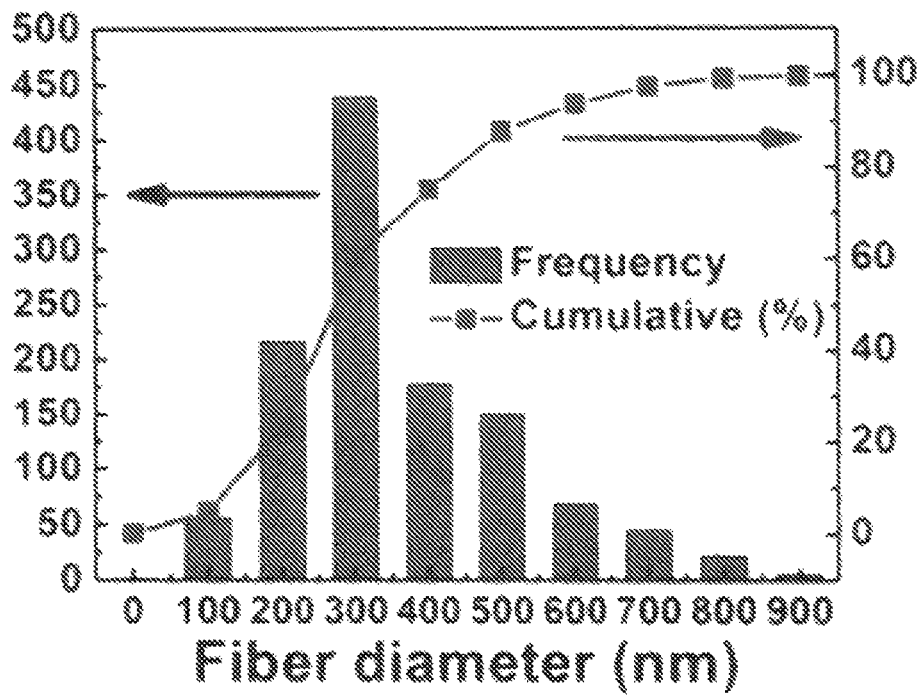
FIG. 11 shows the fiber distribution of the fibers collected from an array of four rods in an embodiment of the electrospinning device as shown in FIG. 4.
Figure 12:
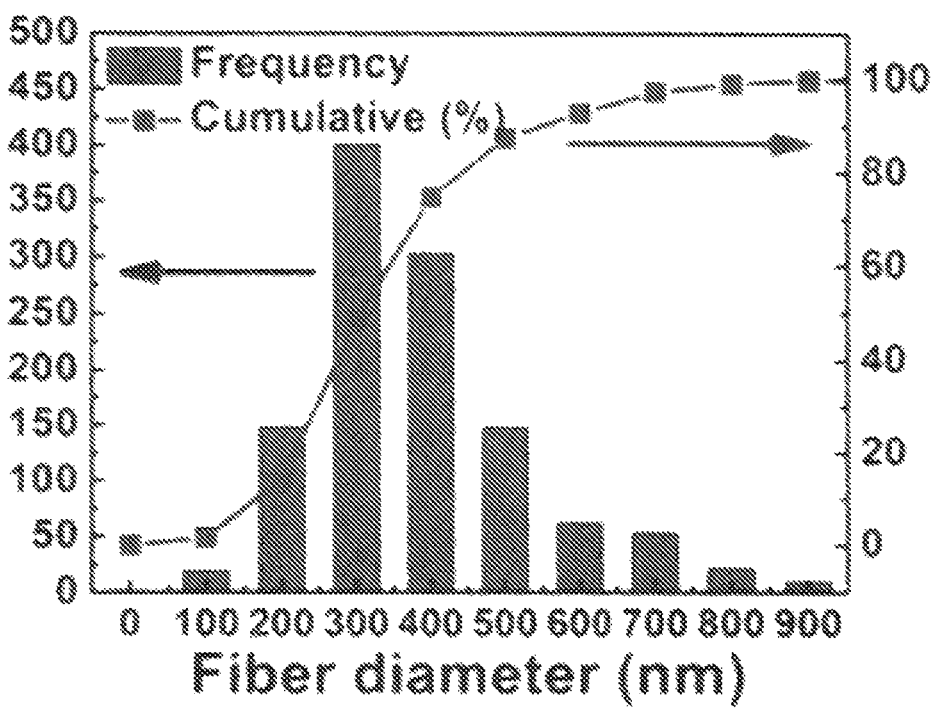
FIG. 12 shows the fiber distribution of the fibers collected from an array of five rods in in an embodiment of the electrospinning device as shown in FIG. 4.

FIG. 9 shows the fiber distribution of the fibers collected from an array of one rod in apparatus 200, FIG. 10 shows the fiber distribution of the fibers collected from an array of two rods in apparatus 200, FIG. 11 shows the fiber distribution of the fibers collected from an array of four rods in apparatus 200, and FIG. 12 shows the fiber distribution of the fibers collected from an array of five rods in apparatus 200. As the graphs show, the diameter distributions of the fibers from the different configurations of apparatus 200 were very similar and hence adding multiple rods to the array did not significantly change the size distributions of the fibers.

It was determined that the average fiber diameter of the fibers produced by single rod array in apparatus 200 was 377±194 nm, the average fiber diameter of the fibers produced by an array of two rods in apparatus 200 was 391±185 nm, the average fiber diameter of the fibers produced by an array of four rods in apparatus 200 was 311±156 nm, and the average fiber diameter of the fibers produced by an array of five rods in apparatus 200 was 333±154 nm. The mean fiber diameters for the different configurations were within one standard deviation of that of the apparatus 100 and the traditional single syringe electrospinning setup 10.

For the same size collector (24 cm by 50 cm) it was determined that the production rate for the single rod array in apparatus 200 was 0.51±0.18 g/hr, the production rate for the array of two rods in apparatus 200 was 0.63±0.28 g/hr, the production rate for the array of four rods in apparatus 200 was 0.87±0.28 g/hr, and the production rate for the array of two rods in apparatus 200 was 1.621±0.47 g/hr. The production rate of fibers for the various configurations of apparatus 200 decreased in comparison to the production rate of fibers for apparatus 100, but was still larger than the production rate for the traditional single syringe electrospinning setup 10.

As an aid to the positioning of the secondary electrodes 220, the electric field lines were modeled using a finite element software (FlexPDE by PDE Solutions Inc). Gauss's law, or the conservation of charge, is used to model the current density vector, j, for a static electric system in a continuum by setting the gradient of the currently density to zero, $$\nabla \cdot j = 0 \tag{1}$$

The electrical conductivity relates the current density to the potential gradient as $$j = -\nabla \varnothing \tag{2}$$

Where $\varnothing$ is the electrical potential (voltage) and is the conductivity of the medium. For a constant conductivity, Eq. (1) and (2) combine to a form of the Laplace's equation in the potential $$\nabla^2 \varnothing = 0 \tag{3}$$

The potential field and the current density vector were calculated and plotted as 2-dimensional cartesian coordinates. Hence Eq. (3) becomes $$\frac{\partial \phi^2}{\partial^2 x} + \frac{\partial \phi^2}{\partial^2 y} = 0 \tag{4}$$

Using the FlexPDE software Eq. (4) was solved and plotted to visualize the electrostatic field lines to aid in positioning of the secondary electrode to direct the jets toward the grounded collector. The calculated potentials were made dimensionless by dividing the potential by the potential difference between the rod and the grounded surface. The rod surfaces were set to a dimensionless unit potential and the grounded surfaces set to zero dimensionless potential. Other boundaries in the solution space were modeled with the gradient of the potential normal to the surface set to zero.

Plots of the electric filed current density and contour plots of the dimensionless potential field for the single rod array, the array of two rods, the array of four rods, and the array of five rods showed that the current density vectors were suppressed between the secondary electrodes 220 and the threaded rod(s) 202 while the arrows were directed towards and converged at the surface of the grounded collector 204.

In light of the foregoing, it should be appreciated that the present invention significantly advances the art by providing an electrospinning electrode and method of producing electrospun fibers that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An apparatus for the production of electrospun fibers using an electrospinning solution comprising:
   a. at least one threaded rod having an exterior surface and having a longitudinal axis oriented vertically,
   b. a grounded collector,
   c. an electrospinning solution dispenser feeding electrospinning solution to the exterior surface of the threaded rod, and
   d. a high voltage power supply.

2. The apparatus of claim 1 wherein the at least one threaded rod is a long-threaded threaded rod.

3. The apparatus of claim 1, wherein the high voltage power supply is connected to the at least one threaded rod by a copper wire and supplies a voltage of between about 30 kV and about 60 kV.

4. The apparatus of claim 1, wherein the electrospinning solution dispenser is selected from the group consisting of a cup, a cap, or a horizontal pipe.

5. The apparatus of claim 4, wherein the electrospinning dispensing apparatus can be made out of any suitable elastomeric material such as Polyvinyl chloride (PVC), polyethylene, polypropylene, or materials such as Plexiglass, acrylics, or polycarbonates.

6. The apparatus of claim 5, wherein the electrospinning solution dispenser is a horizontal pipe and wherein the at least one threaded rod is threaded through at least one aperture in the horizontal pipe.

7. The apparatus of claim 6 further comprising a pressurized reservoir which loads electrospinning solution into the horizontal pipe and allows for the electrospinning solution to flow down the at least one threaded rod.

8. The apparatus of claim 7, wherein the at least one threaded rod contains multiple grooves on its surface, said grooves allowing for the electrospinning solution to flow into the grooves and down along the surface of the at least one threaded rod.

9. The apparatus of claim 7 further comprising a collection device comprising of a collector located at the end of the threaded rod opposite the electrospinning solution dispenser and a pump, wherein the collector collects any excess electrospinning solution and the pump pumps said excess electrospinning solution back to the pressurized reservoir.

10. The apparatus of claim 1, wherein there is one threaded rod and wherein the grounded collector is a cylindrical grounded collector which is positioned coaxially to the threaded rod.

11. The apparatus of claim 1 further comprising at least one secondary electrode positioned around the at least one threaded rod.

12. The apparatus of claim 11, wherein there are three secondary electrodes positioned along three sides of the at least one threaded rod and wherein the grounded collector is positioned along the fourth side of the at least one threaded rod.

13. The apparatus of claim 12, wherein the three secondary electrodes are charged by a secondary power supply, which supplies a voltage less than the voltage supplied by the high voltage power supply.

14. The apparatus of claim 1, wherein the electrospinning solution comprises a polymer and a solvent.

15. The apparatus of claim 14, wherein the polymer is selected from the group consisting of polyvinyl pyrrolidone (PVP), polyethylene oxide (PEO), nylon 6, polyurethanes (PU), polybenzimidazole (PBI), polycarbonate (PC), polyacrylonitrile (PAN), polyvinyl alcohol (PVA), polylactic acid (PLA), polyethylene-co-vinyl acetate (PEVA), polymethacrylate (PMMA)/tetrahydroperfluorooctylacrylate (TAN), collagen-PEO, polyaniline (PANI)/PEO blend, PANI/polystyrene (PS), polyvinylcarbazole, polyethylene terephthalate (PET), polyacrylic acid-polypyrene methanol (PAA-PM), polystyrene (PS), polymethacrylate (PMMA), polyamide (PA), polyvinylchloride (PVC), cellulose acetate (CA), PVA/silica, polyacrylamide (PAAm), poly(lactic-co-glycolic acid) (PLGA), collagen, polycaprolactone (PCL), poly(2-hydroxyethyl methacrylate) (HEMA), poly(vinylidene fluoride) (PVDF), polyether imide (PEI), polyethylene gricol (PEG), poly(ferrocenyldimethylsilane) (PFDMS), poly(ethylene-co-vinyl alcohol), or combinations thereof.

16. The apparatus of claim 14, wherein the solvent is selected from the group consisting of ethanol, water, dimethylformamide (DMF), formic acid, dimethylaccetamide, dicloromethane, DMF:tetrahydrofuran (1:1), chloroform, tetrahydrofuran, distilled water, methylene chloride, dichlormethane, DMF:toluene (1:9), isopropanol, acetone, isopropyl alcohol, isopropanol, hydrochloric acid, camphorsulfonic acid, trifluoracetic acid, carbon disulfide, methylethylketone, acetic acid, hexafluoro-2-propanol, hexa-fluoro-isopropanol (HFIP), or combination thereof.

17. The apparatus of claim 1, wherein the gap distance between the at least one threaded rod and the grounded collector is about 20 cm.

* * * * *